(No Model.)
G. M. HUBBARD.
SNAP HOOK.
No. 554,489. Patented Feb. 11, 1896.
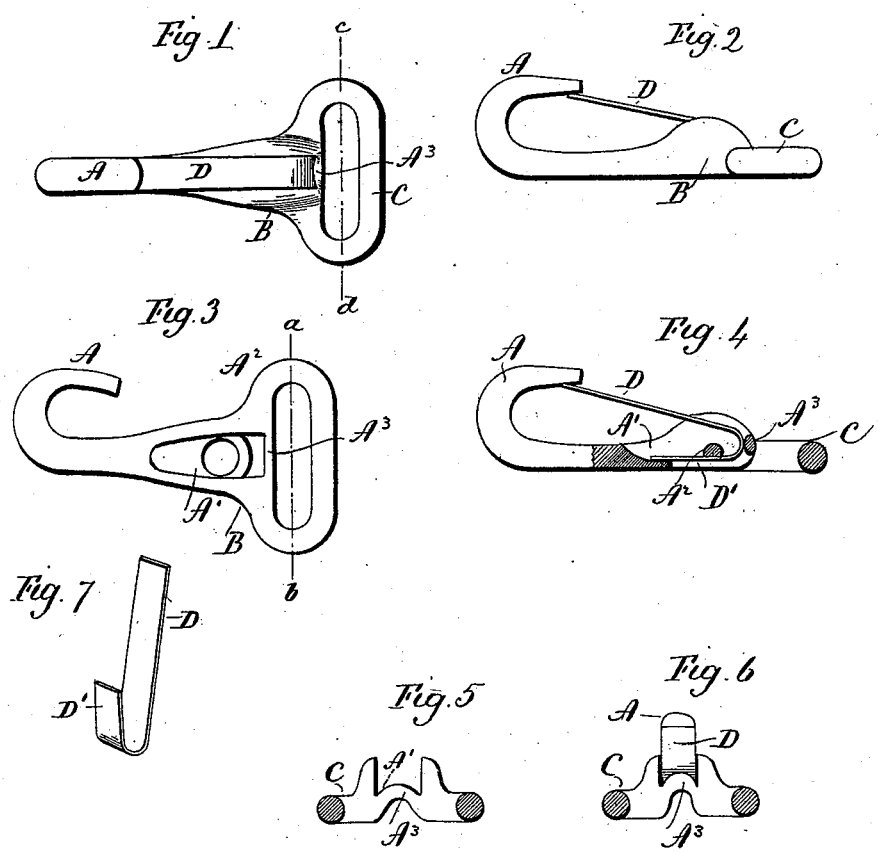

UNITED STATES PATENT OFFICE.

GEORGE M. HUBBARD, OF NEW HAVEN, CONNECTICUT, ASSIGNOR TO THE W. & E. T. FITCH COMPANY, OF SAME PLACE.

SNAP-HOOK.

SPECIFICATION forming part of Letters Patent No. 554,489, dated February 11, 1896.

Application filed June 25, 1894. Serial No. 515,609. (No model.)

*To all whom it may concern:*

Be it known that I, GEORGE M. HUBBARD, of New Haven, in the county of New Haven and State of Connecticut, have invented a new Improvement in Snap-Hooks; and I do hereby declare the following, when taken in connection with the accompanying drawings and the letters of reference marked thereon, to be a full, clear, and exact description of the same, and which said drawings constitute part of this specification, and represent, in—

Figure 1, a plan view of a snap-hook constructed in accordance with my invention; Fig. 2, a view thereof in side elevation; Fig. 3, a view of the body portion of the hook in its original form—that is to say, as it comes from the mold; Fig. 4, a view of the hook in vertical central longitudinal section; Fig. 5, a sectional view of the hook on the line $a\,b$ of Fig. 3; Fig. 6, a similar view on the line $c\,d$ of Fig. 1, but with the tongue left out; Fig. 7, a detached perspective view of the tongue.

My invention relates to an improvement in snap-hooks, the object being to produce at a low cost for manufacture a simple, durable, and effective hook of that class in which the tongue is composed of a short piece of flat spring sheet metal.

With these ends in view my invention consists in a snap-hook having certain details of construction as will be hereinafter described, and pointed out in the claim.

In carrying out my invention, the body of the hook, comprising the hook proper, A, the shank B, and the eye C, is cast in one piece of metal, the shank being cored out to form a tongue-slot A', the opposite walls of which are connected by two bowed retaining-bridges $A^2$ and $A^3$, which support and retain in place the spring-tongue, which has a long and a short leg D and D'. The bridge $A^2$ is located in the bottom of the slot about midway the length thereof, while the bridge $A^3$ is located at the extreme outer end of the slot. In order to enable the tongue and the body portion of the hook to be readily assembled, the tongue-slot A', formed in the shank of the body portion of the hook, is originally made somewhat wider than the width of the tongue and afterward reduced in width to the width thereof by laterally contracting the shank and hence the slot. Under this method of manufacture it will be seen that any variations in the width of the slots and tongues will be compensated for, for the walls of the slots will each time be closed together until they engage with the edges of the tongues. If the bridges $A^2$ and $A^3$ were made straight, they would resist the closing of the walls of the slot together, and I therefore make them bowed in formed, so that, instead of resisting the endwise pressure upon them, they simply bend and increase in curvature. In illustration of this I have shown in Figs. 5 and 6 the bridge $A^3$ before and after its curvature by the contraction of the slot. It will be readily understood, of course, that the bridge $A^2$ increases in curvature in the same manner.

Fig. 3 of the drawings shows the body portion of the hook as the same is cast, with its hook proper turned to one side to facilitate the drawing of the core forming the tongue-slot. The final position of the tongue is shown in Fig. 4, in which its short arm is represented as being engaged with the inner end wall of the tongue-slot and with the lower face of the bridge $A^2$, while its long arm is engaged with the inner face of the extreme end of the hook proper, A, the bow of the hook being engaged with the inner face of the bridge $A^3$.

It is apparent that in carrying out my invention some changes from the exact construction might be made. Thus, instead of employing two bowed bridges, I might make one answer the purpose of holding the tongue in place.

I am aware that it is old to form two aligned inwardly-projecting lugs upon the opposite walls of the tongue-slot formed in the shank of the body portion of a snap-hook, the said lugs being advanced toward each other when the said walls are drawn together for securing the tongue in place in the slot. I do not, therefore, broadly claim casting a snap-hook so as to include means for assisting in the retention of the tongue in its slot.

Having fully described my invention, what I claim as new, and desire to secure by Letters Patent, is—

A cast-metal snap-hook having the opposite walls of the tongue-slot formed in the shank of its body portion, connected by one or more integral, bowed, retaining-bridges exceeding in length the width of the slot, and constructed and arranged to assist in retaining the tongue therein, and bending and increasing in curvature as the slot is contracted to secure the tongue in place, substantially as described.

In testimony whereof I have signed this specification in the presence of two subscribing witnesses.

GEORGE M. HUBBARD.

Witnesses:
E. F. NETTLETON,
JOHN B. COOLEY.